Dec. 26, 1939.   J. R. CAMPBELL   2,184,270
HEATING DEVICE
Filed Aug. 8, 1939                2 Sheets-Sheet 1

Inventor:
James R. Campbell,
by Harry E. Dunham
His Attorney.

Dec. 26, 1939.  J. R. CAMPBELL  2,184,270
HEATING DEVICE
Filed Aug. 8, 1939  2 Sheets-Sheet 2

Inventor:
James R. Campbell,
by Harry E. Dunham
His Attorney.

Patented Dec. 26, 1939

2,184,270

UNITED STATES PATENT OFFICE 2,184,270

HEATING DEVICE

James R. Campbell, Ontario, Calif., assignor to General Electric Company, a corporation of New York Application August 8, 1939, Serial No. 288,975

7 Claims. (Cl. 219—25)

This invention relates to heating devices, more particularly to electric heating devices having a member that is heated by an electrical heating element, and it has for its object the provision of an improved temperature control means for controlling the temperature of the heated member.

While not limited thereto, this invention relates to electric heating devices having a heated body that is utilized to transfer heat to some other object, such as an electric iron whose sole plate is used to impart heat to a material to be pressed; and it contemplates an improved temperature responsive means for controlling the temperature of the heated body which is of simple and inexpensive construction; which is very sensitive in its control, that is, one which holds a very close and even temperature; and one which is durable and mechanically strong.

In accordance with this invention, the control device comprises a suitable switch for controlling the energization of the heating means to apply heat to and shut off the heat from the controlled member, which for example, may be the sole plate of an electric iron. The switch is operated responsively to the expansion and contraction of the controlled member as it is heated and cooled so as to control the heating means to hold a substantially constant temperature in the controlled member. For this purpose, the switch is operated by the relative movement between two bow-shaped elements connected to the controlled member and having a thermal coefficient of expansion different from that of the controlled member. As the controlled member expands and contracts, the bow-shaped elements are moved relatively to each other to operate the switch. Preferably, the switch will be mounted on one of these members, while a switch actuator will be mounted on the other so as to control the operation of the switch as the two members move relative to each other.

Figure 1:
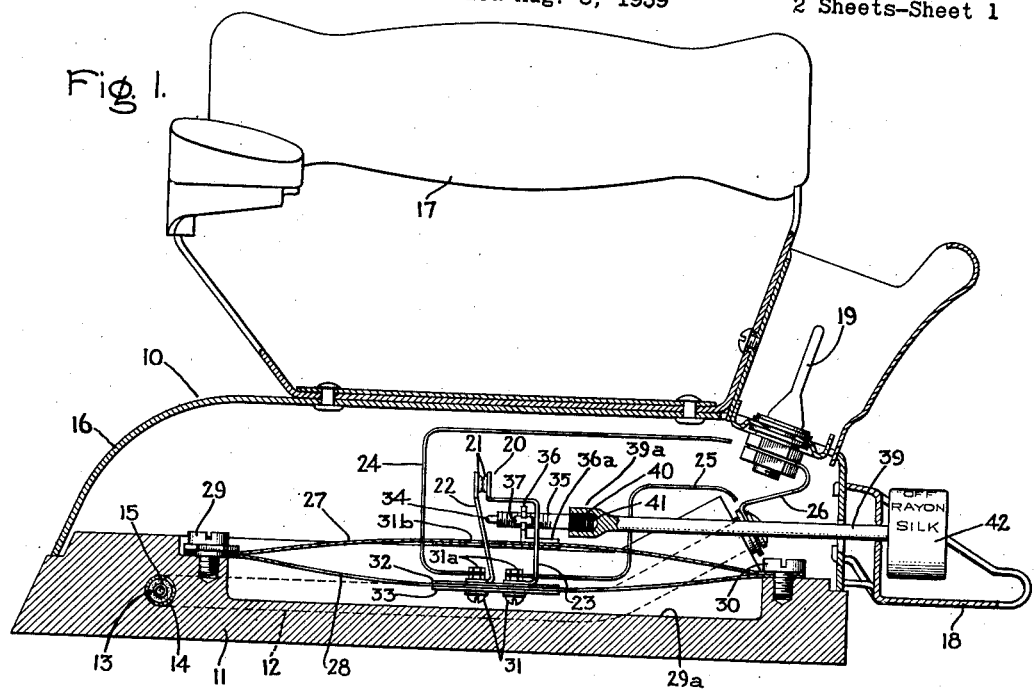
Figure 2:
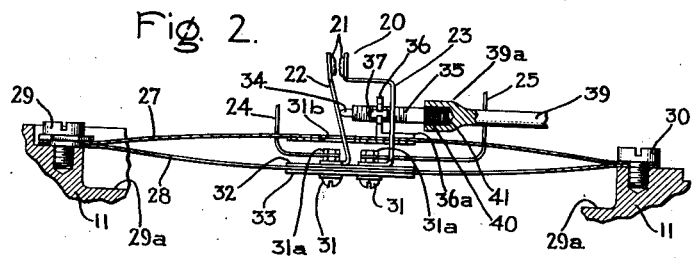
Figure 3:
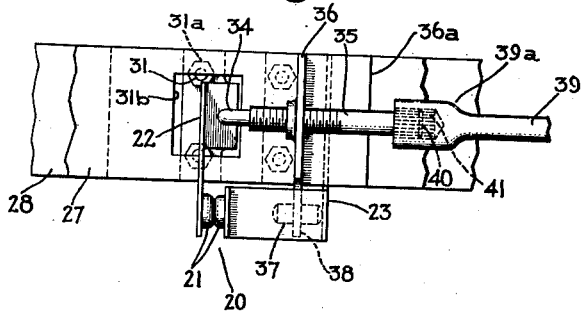
Figure 4:
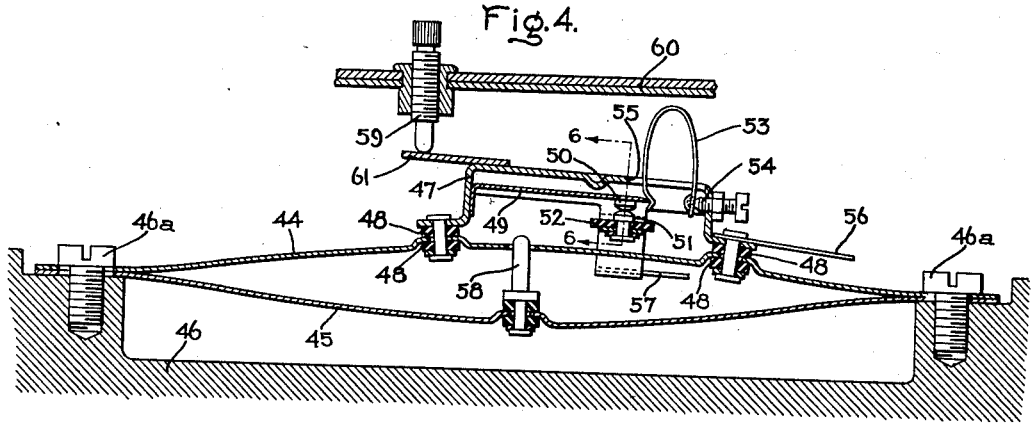
Figure 5:
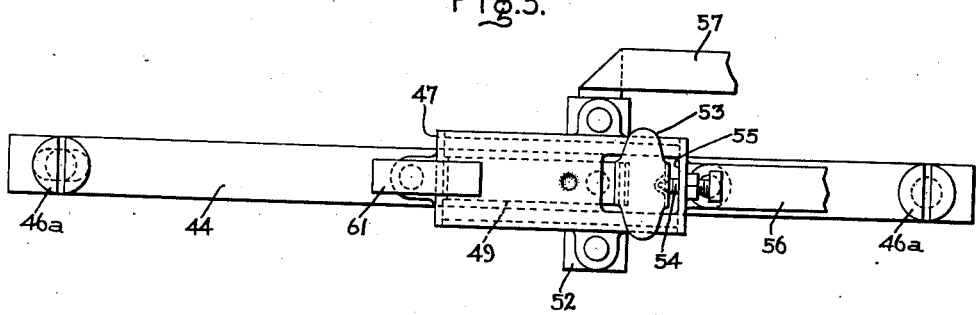
Figure 6:
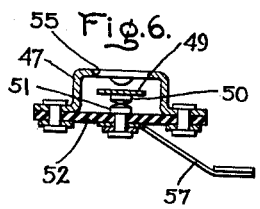

For a more complete understanding of this invention, reference should be had to the accompanying drawings in which Fig. 1 is a vertical elevation in section illustrating an electrically heated flatiron provided with a temperature control device arranged in accordance with this invention; Fig. 2 is a fragmentary elevation of a portion of the control device of Fig. 1 and showing certain of the elements in different operative positions; Fig. 3 is an enlarged fragmentary plan view of the control device shown in Figs. 1 and 2; Fig. 4 is a vertical elevation in section illustrating a temperature control device of modified form arranged in accordance with this invention and applied to the sole plate of an electrically heated iron; Fig. 5 is a plan view of the control device shown in Fig. 4; and Fig. 6 is a sectional view taken through the line 6—6 of Fig. 4.

Referring more particularly to Figs. 1-3, this invention has been shown as applied to an electrically heated flatiron 10 having a sole plate 11 which is formed of any suitable heat-conducting material, such as cast iron or aluminum. This sole plate is heated by a sheathed electrical heating element 12 which preferably will be cast in the sole plate, as shown. While any suitable sheathed heating unit may be used, I prefer to use an element such as described in the United States patent to Charles C. Abbott No. 1,367,341, dated February 1, 1921. Briefly, this heating element comprises a helical resistance conductor 13 mounted in a metallic sheath 14 and supported in spaced relation with reference to the sheath by a compacted layer 15 of a heat conducting, electrically insulating material, such as compacted, granulated magnesium oxide. The iron is provided with a cover 16, a handle 17 and a heel rest 18. Moreover, it is provided with twin supply terminals 19 (only one of which is shown) for the heating element 12.

The energizing circuit for the heating element 12 is controlled by a switch 20 having a pair of co-operating contacts 21. These contacts are mounted on flexible switch arms 22 and 23 which bias the contacts toward each other. The switch arm 22 is electrically connected to one of the supply terminals 19 by means of a suitable flexible lead 24, while the switch arm 23 is electrically connected with one terminal of the heating element by a flexible lead 25. The opposite terminal of this heating element is electrically connected with the other twin supply terminal 19 by means of a lead 26. By reason of these connections the switch contacts 21 are connected in series with the heating element 12 and the electrical supply terminals 19 so that if the iron be connected to a suitable supply source through these terminals and the contacts be closed, the heating element will be energized, where as if the contacts be open the heating element will be deenergized.

The operation of the contacts to their open and closed positions to cut off and reapply the heat to the element 12 is controlled in accordance with the expansion and contraction of the sole plate 11 due to increases and decreases in its temperature. This is accomplished by means of a pair of bow-shaped bars or strips 27 and 28. As shown, these members 27 and 28 have their opposite ends rigidly connected to the sole plate 11 by means of screws 29 and 30. These screws 29 and 30 connect the two ends of the bow-shaped members together, as well as to the sole plate 11. As shown, the central portions of the members 27 and 28 are bowed away from each other. The members 27 and 28 are formed of material having a relatively low coefficient of expansion as compared with the coefficient of expansion of the sole plate 11; and while they may be formed of any suitable material, I prefer to make them from Invar steel. It will be observed, therefore, that when the sole plate 11 expands, the two strips 27 and 28 having a relatively low coefficient of expansion, will be drawn together, whereas when the sole plate 11 cools down and contracts the two strips 27 and 28 will be bowed farther apart. As shown, the sole plate 11 is provided with a recess 29a in which the members 27 and 28 are mounted.

The two switch arms 22 and 23 are mounted upon one of the bow-shaped members, the lower one as viewed in Figs. 1 and 2. They are secured to the lower member 28 by means of small bolts 31 and are electrically insulated from it by insulating sheets 32 and 33 which may be formed of any suitable electrically insulating material, such as mica. These bolts 31 also function to electrically connect the leads 24 and 25 with the switch arms 22 and 23 respectively; as shown, these leads are secured to the bolts by means of suitable nuts 31a. Preferably, the switch arm 22 will be directed upwardly through an aperture 31b provided for it in the upper bowed strip 27 and preferably its upper end will be offset laterally, as shown in Fig. 3. The lower portion of the switch arm 23 will be offset laterally, as shown more clearly in Fig. 3, and its upper end will be offset in a longitudinal direction so as to bring its contact 21 into abutting relation with the other contact 21, as clearly shown in Figs. 1 and 3.

The switch arms 22 and 23, therefore, are mounted on the strip 28 so as to be moved with it as it bows upwardly and downwardly, as viewed in Figs. 1 and 2. The switch arm 23 is held so as to lie in its path of movement transversely of the bowed strips 27 and 28. For this purpose, an insulating member 37 is mounted in an offset arm 38 (Fig. 3) on the bracket 36. This insulator is positioned so that the flexible arm 23 must always lie in its line of movement. The member 37 is formed of any suitable electrically insulating material, such as porcelain. The switch arm 22 will be inclined toward the arm 23, that is, toward its line of movement.

Mounted upon the other bow-shaped strip, namely, the upper strip 27 as viewed in Figs. 1 and 2, is an abutment 34 which is formed of any suitable electrically insulating material, such as porcelain. This abutment 34 is carried by an adjustable screw-like member 35 which is threaded through a supporting bracket 36. This bracket, as shown, is of L-shape having an upright arm in which the screw member 35 is mounted, and a horizontal or longitudinally extending arm 36a which is rigidly secured to the upper surface of the upper bow-shaped member 27 in any suitable manner, as by welding. The abutment 34 is so constructed and arranged and positioned with relation to the switch arms that when the sole plate 11 expands due to an increasing temperature and thereby moves the strips 27 and 28 together it will engage the inclined arm 22 so as to open the switch contacts 21 to de-energize the heating element 12, as shown in Fig. 2; it will be observed that when the bowed strips 27 and 28 are thus moved together, the switch arms will be moved upwardly and the abutment downwardly, as viewed in Figs. 1 and 2, the result being that the abutment engages the inclined arm 22 as previously described to open the contacts 21. Conversely, when the sole plate 11 contracts due to its falling temperature and thereby bows the strips 27 and 28 farther apart, the switch arm 22 will move downwardly from its position of Fig. 2 toward its position of Fig. 1 and thereby will permit the switch contacts to reclose and re-energize the heating element 12.

The mean temperature between the high and low values at which the heat is cut off and re-applied to the sole plate 11 may be adjusted by shifting the position of the abutment 34 with reference to the switch arm 22. This is accomplished by rotating the screw 35 in its bracket 36. For this purpose, an adjustment rod 39 is provided. The rod 39 has a driving connection 39a with the screw member 35; as shown, this driving connection comprises a knurled section 40 on the screw member 35 received in a correspondingly knurled socket 41 on the rod 39. The rod 39 extends through the rear wall of the casing 16 and projects outwardly into the heel rest 18, as clearly shown in Fig. 1. Mounted on the protruding end of the rod 39 is an adjusting knob 42 which is provided with suitable indicia to indicate the proper temperature setting for various materials, such as rayon, silk, woolen and the like; preferably, the knob is marked with these words. The knob is also provided with the indication "off". This corresponds to an "off" position of the switch 20 which is effected by rotating the knob and horizontal abutment 34 to such a position that the abutment will positively engage the switch arm 22 to separate the switch contacts 21, irrespective of the temperature of the sole plate 11.

In the form of this invention shown in Figs. 4, 5 and 6, a snap-action spring has been included in the temperature control device. Here a pair of strips 44 and 45 have their opposite ends rigidly connected to the sole plate 46 by bolts 46a so that the central portions of the strips are bowed apart as in the form shown in Figs. 1 and 2. Here the strips also preferably will be formed of Invar steel. An inverted U-shaped bracket 47 is rigidly mounted on the upper strip 44 and is electrically insulated from it by means of suitable insulating washers 48 formed of any suitable material, such as mica. An L-shaped spring switch arm 49 has its short leg rigidly secured to one leg of the U-shaped bracket, as shown, while its long leg is free to move. This long leg carries at its end a contact 50 which co-operates with a fixed contact 51, and the switch arm biases its contact 50 into engagement with contact 51. The fixed contact 51 is mounted on an electrically insulating plate 52 secured to the bracket 47, as clearly shown in Figs. 4 and 6. Co-operating with the movable end of the switch arm 49 is an over-center snap spring 53. As shown, this spring is in the form of an inverted U, and has one leg bearing on the free end of the switch arm 49 and its opposite leg bearing on a fixed pivot 54 adjustably mounted on the bracket 47. This spring, as shown, projects upwardly through an aperture 55 provided for it in the bracket 47. The switch contacts 50 and 51 are connected in the electrical circuit to be controlled by means of a lead 56 electrically connected with the bracket 47, as shown, and by means of a second lead 57 electrically connected with the fixed contact 51. These leads will be connected in the circuit of the iron, as in the first form shown in Figs. 1, 2 and 3.

Mounted on the lower bowed strip 45 is a pin-like plunger 58 which is arranged to operate the switch arm 49. It will be observed that when the sole plate expands due to an increase in temperature, the bowed strips 44 and 45 will be brought together and will move the plunger 58 upwardly and the switch arm 49 downwardly so that at a predetermined high temperature the plunger engages the switch arm to open the contacts. The spring 53 effects a snap-opening of the contacts. When the sole plate cools responsively to the removal of the heat from it, it will contract and will bow the strips 44 and 45 farther apart and ultimately at a predetermined low temperature will remove the plunger 58 from the switch arm and thereby permit it to move downwardly to close the contacts, the spring 53 effecting a snap closure.

The temperature setting of this device may be changed by varying the position of the bracket 47 and upper strip 44 with reference to the lower strip 45 and the plunger 58. This may be accomplished by an adjusting screw 59 mounted in the cover 60 of the iron and engaging an extension 61 on the bracket. If the adjusting screw be operated to move the bracket and upper strip downwardly sufficiently far, the switch arm 49 will engage the plunger 58 and will positively open the switch contacts 50 and 51, irrespective of the temperature of the sole plate.

It will be observed that I have provided a very simple and inexpensive temperature control device which has a wide temperature range. It may be easily and conveniently adjusted in its temperature both initially and in use. "Reed" action or fluttering between the contacts is eliminated due to frictional engagement of the abutment in each form with the switch arm that co-operates with it. This insures a long contact life and obviates dangerous arcing at the contacts. Moreover, it insures that the contacts are quite definitely opened.

In addition, there is practically no overshoot in the temperature of the controlled sole plate. A substantially uniform temperature is maintained within very close high and low temperature limits for any particular setting of the control device.

While I have shown particular embodiments of my invention, it will be understood, of course, that I do not wish to be limited thereto since many modifications may be made, and I, therefore contemplate by the appended claims to cover any such modifications as fall within the true spirit and scope of my invention.

What I claim as new and desire to secure by Letters Patent of the United States is:

1. A heating device comprising a heating member, heating means for heating said member, a pair of bow-shaped members having their ends secured to said heating member and said bowed members having different coefficients of expansion than said heating members so that they move relatively to each other as the temperature of said heating member varies, a pair of cooperating switch contacts carried by one of said bow-shaped members controlling said heating means to shut off heat from and reapply the heat to said heating member, and a member carried by the other of said bow-shaped members operating to open and close said contacts to control the application of heat to said heating member responsively to said relative movement between said bow-shaped members due to the changing temperature conditions in said heating member.

2. A heating device comprising a heating member, heating means for heating said member, a pair of bow-shaped members having their ends secured to said heating member so that their central portions bow away from each other, and said members having different coefficients of expansion than said heating member whereby said central portions move toward and away from each other as the temperature of said heating member varies, a pair of switch members for controlling said heating means to apply heat to and cut it off from said heating member mounted on the central portion of one of said bow-shaped members, and an actuating member mounted on the central portion of the other of said bow-shaped members cooperating with one of said switch members to operate it responsively to relative movement of said bow-shaped members to control said heating means to hold a substantially constant temperature in said heating member.

3. In an electrically heated device having a metallic heating member, electrical heating means for said member, means for controlling said heating means comprising a pair of bowed members having a relatively low coefficient of thermal expansion as compared with that of said heating member, means securing the ends of said bowed members to said heating member so that their central portions bow away from each other, a pair of switch contact arms mounted on one of said members and carrying cooperating switch contacts, said arms being moved transversely with reference to said bowed members by movement of said members relative to each other due to expansion and contraction of said heating member, one of said arms being inclined to the direction of movement of said arm, means connecting said arms in circuit with said heating means to control its energization, an abutment carried by the other of said bow-shaped members positioned to engage said inclined switch arm to open and close said contacts responsively to relative movement between said bow-shaped members, and means for adjusting the position of said abutment.

4. An electric flatiron comprising a sole plate, a heating element in thermal relation with said plate, a pair of metallic strips having a relatively low coefficient of thermal expansion as compared with that of said sole plate, means securing the ends of said strips together and to said sole plate with the central portions of said strips bowed away from each other, a pair of cooperating switch contacts controlling said heating element, a pair of switch arms operating said contacts mounted on one of said strips and movable thereby when the relative position of said strips is changed, one of said arms lying in its line of movement and the other arranged at an angle to said line of movement, an abutment adjustably mounted on the other strip and arranged to engage said inclined arm to move it to open and close said contacts responsively to relative movement of said strips as the temperature of said sole plate rises and falls, and an adjustment member for said abutment accessible on the outside of said iron controlling the position of said abutment relative to said inclined switch arm.

5. A heating device comprising a heating member, means for heating said member, a pair of bow-shaped members having their ends secured to said heating member, and said bowed members having different coefficients of expansion than said heating member so that they move relatively to each other as the temperature of said heating member varies, a bracket carried by one of said bow-shaped members, a contact carried by said bracket, a second contact cooperating with said contact, a switch arm carrying said second contact, an over-center spring between said switch arm and said bracket for effecting quick movement of said switch arm to open and close said contacts, and an operating member carried by the other bow-shaped member controlling the operation of said switch arm responsively to relative movement of said bow-shaped members.

6. A heating device comprising a heating member, means for heating said member, a pair of bow-shaped members having their ends secured to said heating member, and said bowed members having different coefficients of expansion than said heating member so that they move relatively to each other as the temperature of said heating member varies, a bracket carried by one of said bow-shaped members, a contact carried by said bracket, a second contact cooperating with said contact, a switch arm carrying said second contact, an over-center spring between said switch arm and said bracket for effecting quick movement of said switch arm to open and close said contacts, an operating member carried by the other bow-shaped member controlling the operation of said switch arm responsively to relative movement of said bow-shaped members, and means for adjusting the position of said bracket and its bow-shaped member relative to said operating member.

7. A heating device comprising a heating member, means for heating said member, a pair of bow-shaped members having their ends secured to said heating members and said bowed members having different coefficients of expansion than said heating member so that they move relatively to each other as the temperature of said heating member varies, and a switch for controlling said heating means mounted on one of said bow-shaped members and an actuator for said switch mounted on the other constructed and arranged to operate said switch to control said heating means as the bow-shaped members move relatively to each other responsively to temperature changes in said heating member so that a substantially constant temperature is maintained in said heating member.

JAMES R. CAMPBELL.